Oct. 1, 1957    C. H. FAULKINGHAM    2,808,132
FLUID BRAKE WITH FILTERING MEANS
Filed Sept. 9, 1955

INVENTOR
CLIFFORD H. FAULKINGHAM
BY Paul D. Boone
ATTORNEY

2,808,132
FLUID BRAKE WITH FILTERING MEANS

Clifford H. Faulkingham, Orlando, Fla.

Application September 9, 1955, Serial No. 533,339

3 Claims. (Cl. 188—152)

This invention relates to cylinders for fluid brake systems, and more particularly to a strainer or filter associated with and located within the cylinder.

It frequently occurs that foreign matter such as rust scale, fine sand, and other harmful solid material, finds it way into the brake fluid and thence into the brake cylinder. This sometimes result in scoring of the cylinder walls and/or the brake-applying piston. This scoring permits leakage of the brake fluid and resulting failure of the brake system. At times water also may enter the system and produce rusting of the brake cylinder or brake piston.

It is an object of the present invention to insert straining or filtering means in the brake cylinder and to interpose these means between the fluid inlet to the cylinder and the brake-applying piston or pistons.

It is also an object of the invention so to modify the conventional brake cylinder that the additional parts are relatively simple and inexpensive, yet effective to prevent entrance of foreign material into the working parts of the brake-applying mechanism.

Figure 1:
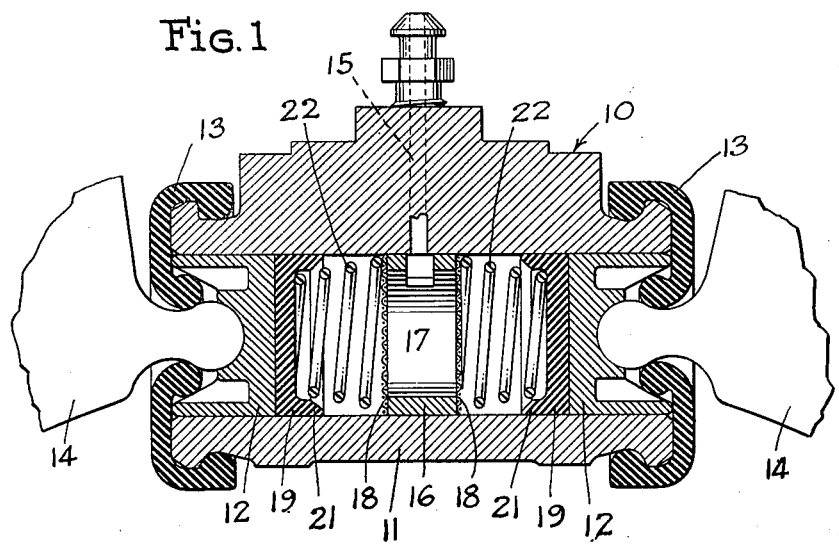
Figure 2:
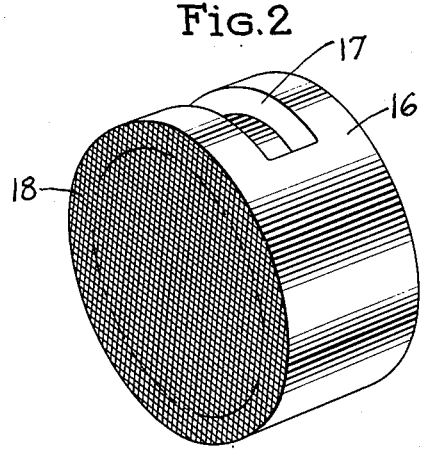

Other objects will be apparent from the following description of the invention when taken with the accompanying drawings, in which Fig. 1 is a front elevation, partly in section, of a brake cylinder illustrating a preferred embodiment of the invention; and Fig. 2 is a perspective view of an inner sleeve which fits within the cylinder and showing a strainer abutting an end thereof.

In the drawings it will be seen that the brake-applying unit 10 includes a cylinder 11, pistons 12, and resilient caps 13, the latter being engageable with the ends of brake shoes 14. Brake fluid is admitted to the cylinder from a master cylinder through inlet 15 and permitted to bleed therefrom to the brake fluid reservoir. Centrally disposed in the cylinder and having a tight fit therein is a sleeve 16. If desired, the sleeve may be split so that it may expand and contract to adjust itself to variations in the inner diameter of cylinder 11 and lock itself in place. This sleeve is provided with an opening 17 aligned with the inlet and discharge passages so that fluid entering the cylinder must first pass through the sleeve. Abutting each end face of the sleeve is a disc 18 made from a fine wire mesh screen, the diameter of this disc being substantially that of the inner diameter of the cylinder and the outer diameter of the sleeve. Preferably the periphery of each disc is metal edged or reinforced.

The metal pistons 12 are of the conventional type with cup-shaped resilient discs 19 abutting the inner faces thereof, the flanges 21 being expansible under fluid pressure to provide leak-proof contact with the inner wall of the cylinder. Interposed between each strainer 18 and one of the cups 19 is a compression spring 22. The diameter of spring at its inner end is substantially that of the strainer and at its outer end the diameter of the spring is sufficiently small to fit within the flange of the cup 19, thereby being restrained to be positioned centrally with respect to the axis of the cylinder. It will, therefore, be noted that the spring exerts axial pressure in one direction to move the piston toward the brake shoe, and, in the opposite direction, to hold the strainer firmly against sleeve 16.

From the foregoing description it will be apparent that the screen or filter will permit brake fluid under pressure to pass therethrough, but will prevent foreign matter introduced into the fluid from reaching the pistons or cylinder walls adjacent to the pistons. The springs are sufficiently strong to hold the screen tightly against the sleeve at all times so that, when brake pressure is applied, the screen will not be displaced. When brake pressure is released, the reverse flow of brake fluid tends to dislodge foreign matter on the screen so that there is no danger of the screen becoming clogged.

A preferred form of the invention has been described, but it is obvious that the arrangement is applicable to single piston brake cylinders as well as to cylinders having stepped interior diameters, it being only necessary in the latter to modify the sleeve and springs to correspond with the stepped dimensions. Such modifications are contemplated within the terms of the appended claims.

What is claimed is:

1. In a fluid brake, a brake shoe, a cylinder, a piston in said cylinder and engageable with said shoe, said cylinder having an inlet for brake fluid under pressure, a cylindrical sleeve in said cylinder, said sleeve fitting the inner wall of said cylinder and having a radial opening aligned with said inlet, and a strainer associated with said sleeve, said strainer being interposed between said opening and said piston.

2. In a fluid brake, a brake shoe, a cylinder, a piston in said cylinder and engageable with said shoe, said cylinder having an inlet for brake fluid under pressure, a cylindrical sleeve in said cylinder, said sleeve fitting the inner wall of the cylinder and having a radial opening aligned with said inlet to permit fluid to pass from said inlet through said sleeve, a strainer abutting the end face of said sleeve, and spring means engaging said piston and said strainer to hold said strainer tightly against said sleeve.

3. In a fluid brake, a brake shoe, a cylinder, a piston in said cylinder and engageable with said shoe, said cylinder having an inlet for brake fluid under pressure, a resilient cup abutting the inner face of said piston, a cylindrical sleeve in said cylinder, said sleeve forming a tight fit with the inner wall of said cylinder and having a radial opening aligned with said inlet, a circular strainer abutting the end face of said sleeve, and a tapered compression spring, the diameters of the larger end of said spring and said strainer being substantially that of the inner wall of said cylinder, the diameter of the smaller end of said spring being such as to rest within said resilient cup.

References Cited in the file of this patent

UNITED STATES PATENTS

| 1,980,616 | Engel | Nov. 13, 1934 |
| 2,331,393 | Hall | Oct. 12, 1943 |
| 2,329,095 | White | Sept. 7, 1943 |